United States Patent
Ebert et al.

(10) Patent No.: US 8,657,654 B2
(45) Date of Patent: Feb. 25, 2014

(54) CLIPPING MACHINE WITH A SHORTENED CRANK DRIVE

(75) Inventors: Detlef Ebert, Bad Nauheim (DE); Meik Schmidt, Braunfels (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 13/554,410

(22) Filed: Jul. 20, 2012

(65) Prior Publication Data
US 2013/0189912 A1 Jul. 25, 2013

(30) Foreign Application Priority Data

Jul. 21, 2011 (EP) .................................... 11005998

(51) Int. Cl.
*A22C 11/00* (2006.01)
(52) U.S. Cl.
USPC ............................................................ 452/35
(58) Field of Classification Search
USPC ............ 452/21–26, 30–32, 35–38, 46–48, 51
See application file for complete search history.

(56) References Cited

U.S. PATENT DOCUMENTS

| | | | |
|---|---|---|---|
| 3,543,378 A | | 12/1970 | Klenz |
| 4,017,941 A | * | 4/1977 | Raudys et al. .................. 452/31 |
| RE30,390 E | * | 9/1980 | Kupcikevicius et al. ....... 452/31 |
| 4,669,149 A | * | 6/1987 | Kawai et al. .................... 452/45 |
| 6,101,785 A | | 8/2000 | Bienert et al. |
| 6,217,436 B1 | | 4/2001 | Hanten et al. |
| 6,298,635 B1 | | 10/2001 | Bienert et al. |
| 7,451,582 B2 | | 11/2008 | Ebert |
| 7,654,889 B2 | * | 2/2010 | Ebert et al. ...................... 452/48 |
| 7,775,861 B2 | * | 8/2010 | Sames .............................. 452/32 |
| 8,308,533 B2 | * | 11/2012 | Haslacher ........................ 452/32 |
| 2006/0292970 A1 | | 12/2006 | Ebert |

FOREIGN PATENT DOCUMENTS

| | | |
|---|---|---|
| DE | 196 44 074 A1 | 5/1998 |
| DE | 197 38 298 C1 | 4/1999 |
| DE | 10 2005 029 227 A1 | 12/2006 |

OTHER PUBLICATIONS

Document XP-002664810—Still: Reuleaux D.11 Double Slider-Crank Mechanism-Inversion CAD Picture as obtained from http://kmoddl.org/machinesandmechanisms/index.php/Still:_Reuleaux_D.11_Double_Slider-Crank . . . on Feb. 12, 2011, 2 pages.
DE 196 44 074 A1—English abstract obtained from Espacenet (http://worldwide.espacenet.com) on Dec. 11, 2012, 2 pages.
DE 197 38 298 C1—English abstract obtained from Espacenet (http://worldwide.espacenet.com) on Dec. 11, 2012, 2 pages.
DE 10 2005 029 227 A1—English abstract obtained from Espacenet (http://worldwide.espacenet.com) on Dec. 11, 2012, 2 pages.

* cited by examiner

*Primary Examiner* — Richard Price, Jr.
(74) *Attorney, Agent, or Firm* — Hahn Loeser & Parks LLP

(57) ABSTRACT

The present invention relates to a clipping machine for producing sausage-shaped products. The clipping machine comprises a filling tube for feeding the filling material into a packaging casing, gathering elements for gathering the filled packaging casing and for forming a plait-like portion thereto, and a clipping device for applying at least one closure clip to the plait-like portion and closing said closure clip. Furthermore, the clipping device includes a drive for driving the first closing tool. Said drive comprises a crank shaft having a crank pin, and a plunger having a central axis, for holding and linearly moving the first closing tool between its opened and closed position along its central axis. A guide track is mounted to said plunger, and a slide block pivotally attached to the crank pin is in slidable engagement with said guide track for moving said plunger along its central axis.

8 Claims, 5 Drawing Sheets

US 8,657,654 B2

CLIPPING MACHINE WITH A SHORTENED CRANK DRIVE

This application claims priority to, and the benefit of, European Patent Application No. 11 005 998.7 filed Jul. 21, 2011 with the European Patent Office, which is hereby incorporated by reference.

BACKGROUND OF THE INVENTION

The present invention relates to a clipping machine for producing sausage-shaped products.

In particular, the present invention relates to a clipping machine for producing sausage-shaped products, like sausages, by filling a flowable filling material into a tubular or bag-shaped packaging casing and closing said packaging casing by a closure means, like a closure clip. The clipping machine comprises a filling tube for feeding the filling material into the tubular or bag-shaped packaging casing stored on the filling tube and closed at its first end, gathering means for gathering the filled tubular or bag-shaped packaging casing and for forming a plait-like portion thereto, and a clipping device having a first and a second closing tool both reversibly movable between an opened position and a closed position, for applying at least one closure means to the plait-like portion and closing said closure means when the closing tools are in their closed position. Moreover, the clipping device includes a drive means for driving at least the first closing tool.

In practice, it is known that, for example in the production of sausage-shaped products, like sausages, filling material is fed by a filling machine through a filling tube of a clipping machine into a tubular packaging casing which is stored on the filling tube and which is closed at its front end, i.e. the end pointing in the feeding direction of the filling material by a closure means, like a closure clip. The tubular packaging casing is pulled off from the filling tube while being filled by the feeding pressure. After a predetermined volume of filling material has been filled into said tubular packaging casing, a displacer arrangement with a first and a second displacer unit which can each be formed by a pair of reversibly moveable displacement elements shapes a plait-like portion of the tubular packaging casing. The clipping machine then places and closes at least one closure clip at the plait-like portion forming the rear end of the sausage shaped product, i.e. the end pointing against the feeding direction by respective closing tools which are reversibly movable towards the plait-like portion.

For reversibly moving the first and second closing tools between their opened and closed positions, various kinds of drive mechanisms are used. From DE patent 197 38 298, a clipping machine is known, wherein the first and second closing tool, a punch and a die, are mounted to first ends of respective closing levers. Said closing levers are coupled by their second ends to a common pivot axis. For reversibly moving the closing tools between their opened and closed position, in order to place and close a closure clip on the filled and gathered tubular packaging casing, the closing levers are driven by a cam plate.

From DE laid open document 196 44 074, a clipping machine is known, wherein the first and second closing tools are linearly moved between their opened and closed position. The closing tools are driven by respective piston/cylinder drives.

In DE patent 10 2005 029 227, a drive mechanism for a closing tool is disclosed, which includes a toggle joint drive having toggle levers for linearly moving the first closing tool towards the plat-like portion of a packaging casing for closing a closure clip applied thereto.

In particular cases, a linear movement of one or both of the closing tools may be required. The known linear drive mechanisms are of a complex structure, e.g. when using toggle levers, or require a complex control for synchronizing the drives, e.g. in case separate drives for the first and second closing tool. Moreover, these known drives require a lot of space within the housing of the clipping machine.

Thus, it is an object of the present invention to provide a clipping machine including a linear drive for at least one of the closing tool, requiring a reduced effort for adjusting and controlling said clipping machine, and having a simplified construction.

BRIEF SUMMARY OF THE INVENTION

According to the present invention, there is provided a clipping machine for producing sausage-shaped products, like sausages, by filling_a flowable filling material into a tubular or bag-shaped packaging casing and closing said packaging casing by a closure means, like a closure clip. The clipping machine comprises a filling tube for feeding the filling material into the tubular or bag-shaped packaging casing stored on the filling tube and closed at its first end, gathering means for gathering the filled tubular or bag-shaped packaging casing and for forming a plait-like portion thereto, and a clipping device having a first and a second closing tool reversibly movable between an opened position and a closed position, for applying at least one closure means to the plait-like portion and closing said closure means when the closing tools are in their closed position. The clipping device includes a drive means for driving the first closing tool. In the inventive clipping machine, said drive means for driving the first closing tool comprises a crank shaft having a crank pin and a plunger having a central axis, for holding and linearly moving the first closing tool between its opened and closed position along its central axis, wherein a guide track is mounted to said plunger, and a slide block pivotally attached to the crank pin is in slidable engagement with said guide track for moving said plunger along its central axis.

In this configuration, the drive means for the first closing tool is of a simplified and compact construction including a marginal number of components whereby the effort for adjusting and controlling said clipping machine is reduced.

In an advantageous configuration, the guide track is formed by an at least approximately semicircular formed bar. Depending on the angle and the diameter of the semicircular guide bar, the velocity plot of the first closing tool coupled to the plunger may be selected.

The guide track may have any desired design, like a segment of a circle or a combination of two contrarily curved segments. In case that the guide track is formed by linear bar, a sinusoidal velocity plot of the first closing tool may be realized.

The slide block is in slidable engagement with the guide track. In a particular embodiment of the guide track, said guide track includes a guide slot being engaged by the slide block. In this case, the guide block may comprise a bolt or the like, which is guided in said guide slot. Alternatively, in case that the guide track is a solid bar, the guide block may comprise angled lugs for encompassing the guide track.

For preventing the plunger from rotating about its central axis and for avoiding side loads thereto, the guide track is slidably coupled to a guide bolt.

In a preferred embodiment of the inventive clipping machine, the slide block includes adjusting means for adjusting the position of the slide block relative to the crank pin. Said adjusting means enable an adjustment of the position of the first closing tool in its extreme positions and along the central axis of the plunger, relative to the second closing tool.

In a further preferred embodiment of the inventive clipping machine, the adjusting means include an excenter means which allow an easy and accurate adjustment of the position of the first closing tool relative to the second closing tool.

For producing single sausage-shaped products, normally, a cutting device is provided and moved into a cutting position, for cutting-off the sausage-shaped product just produced from the casing material remaining on the filling tube. According to the present invention, a cutting unit for cutting-off the sausage-shaped product just produced from the remaining tubular packaging casing is mounted to the lower end of the plunger and thus, in the region of the first closing tool. An additional drive mechanism for moving the cutting mechanism towards the cutting position is thereby avoided.

Further advantages and preferred embodiments will be described in the following together with the drawings listed below. The expressions "left", "right", "below" and "above" used in the following description, are referred to the drawings in an alignment such that the reference numbers and the notation of the Figs. used can be read in normal orientation.

DETAILED DESCRIPTION OF THE INVENTION

Figure 1:
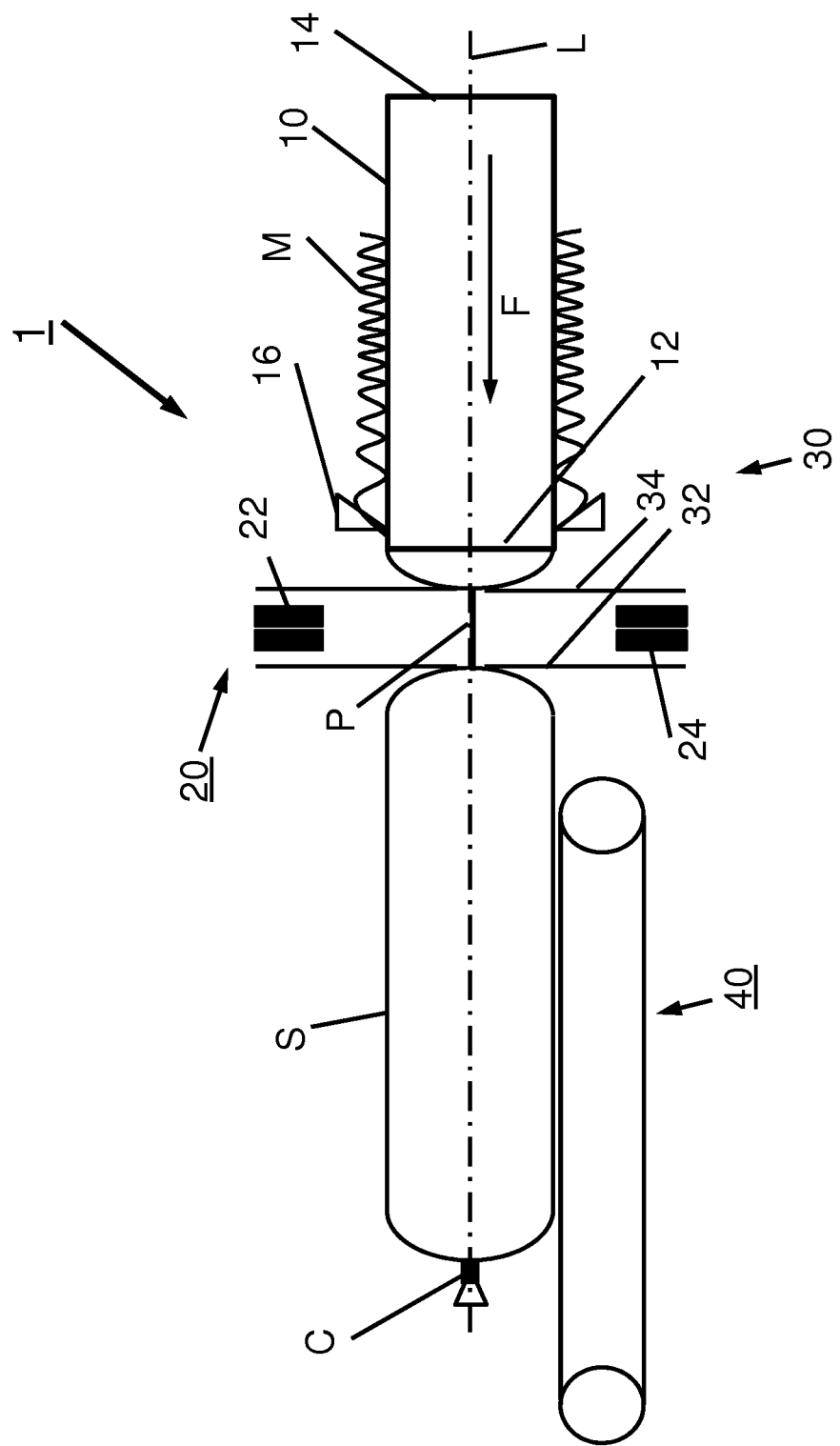
FIG. 1: is a schematic view to the clipping machine according to the present invention, wherein the tubular packaging casing is filled and gathered.

The clipping machine 1 for producing sausage-shaped products S according to FIG. 1, comprises as main components a circular cylindrical filling tube 10 having a longitudinally extending central axis A and being made of stainless steel, wherein tubular packaging casing M made of a thin sheet material is stored on the filling tube 10, gathering means 30 for gathering the filled tubular packaging casing M and for forming a plait-like portion thereto are arranged downstream filling tube 10, and a clipping device 20 for closing the filled tubular packaging casing M by applying a closure means, like a closure clip C, to said plait-like portion P.

As it can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F. A casing brake device 16 is arranged on filling tube 10 in the vicinity of left end 12 of the filling tube 10 in order to control the movement of tubular packaging casing M when pulled-off from filling tube 10 by the filling pressure.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tool includes a punch and a die. Gathering means 30 includes a first displacer unit 32 and a second displacer unit 34, wherein first displacer unit 32 is positioned downstream second displacer unit 34. First and second pair of clipping tools 22, 24 of clipping device 20 are positioned between first and second displacer units 32, 34.

Furthermore, for discharging sausage-shaped product S just produced from the clipping machine 1, downstream clipping device 20, a transportation device or belt conveyor 40 is arranged, comprising a conveyor belt and guide rollers. Transportation direction T of belt conveyor 40 coincides with feeding direction F. The height of the upper conveyor belt section of conveyor the belt is aligned to the lower side of the sausage shaped product S to be produced and discharged from clipping machine 1.

Figure 2:
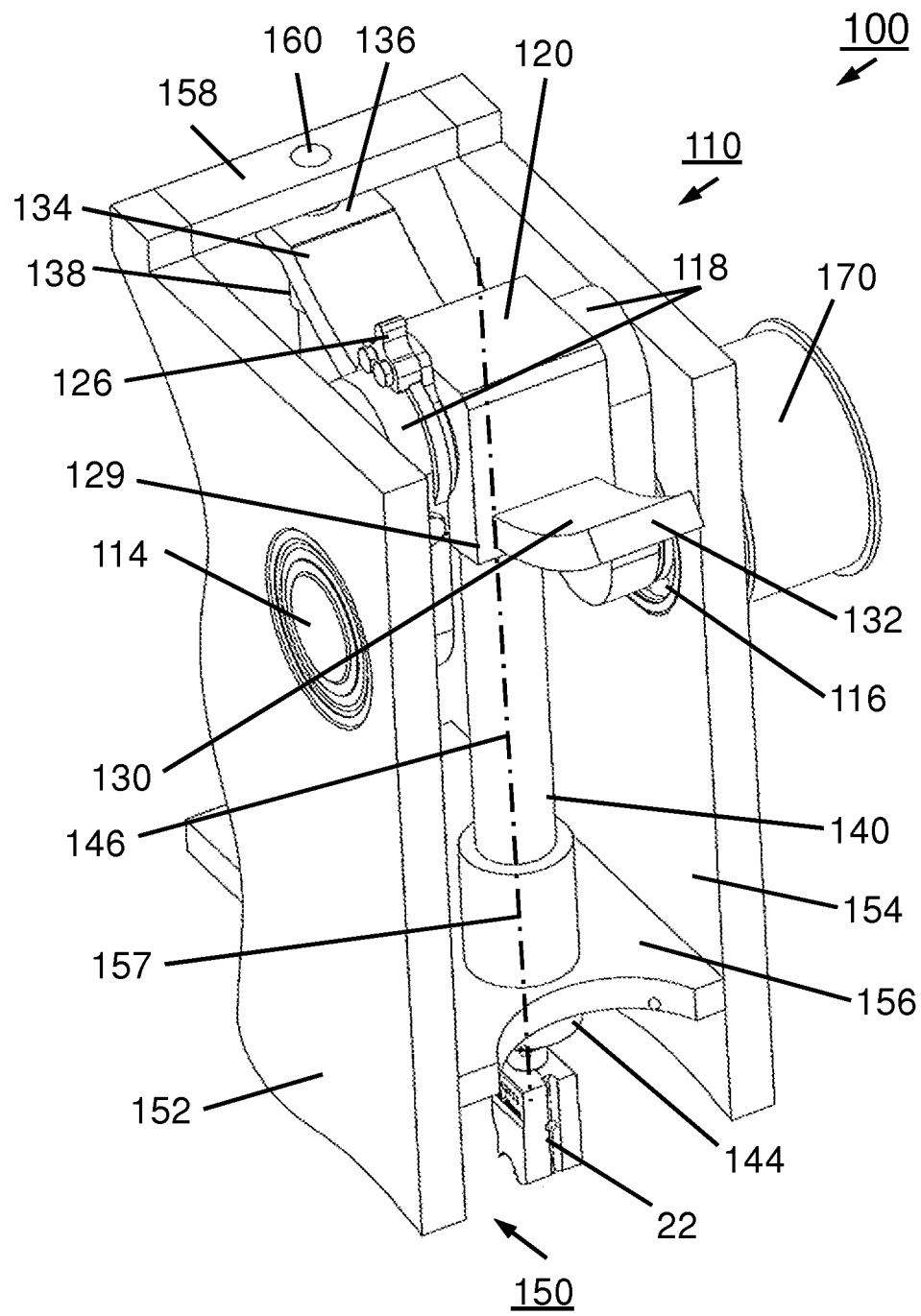
FIG. 2: is a schematic and perspective view to a drive means for a first closing tool of the clipping machine according to FIG. 1 with a crank pin in the upper extreme position, having a concave curved guide track.

As it can be inferred from FIG. 2, according to the present invention, first closing tool 22 is linearly driven by a drive means or a drive 100 which includes a crank shaft 110 having a crank pin 112 (visible only in FIG. 3), a slide block 120 pivotally attached to crank pin 112, a guide track 130 and a plunger 140.

Clipping machine 1 further comprises a frame work 150. Approximately horizontally aligned crank shaft 110 includes two center pins 114, 116 rotatable held by respective bearings in vertically arranged side frames 152, 154 of frame work 150, and two crank arms 118 with crank pin 112 there between. A pulley 170 is coupled to center pin 116 for driving crank shaft 110.

Slide block 120 is pivotally attached to crank pin 112 of crank shaft 110 by a central through hole 122 through which crank pin 112 extends. The width of slide block 120 corresponds to the length of crank pin 112. Inserted into through hole 122 of slide block 120 is a bushing 124 having an excentric central hole for excentrically aligning slide block 120 to crank shaft 112. Bushing 124 has a length which is slightly larger than the length of slide block 120 and thus, projecting from slideblock 120 at one side. Mounted to the projecting end of bushing 124 is a handle 126 for rotating bushing 124 relative to crank pin 112. Handle 126 includes fixing means for fixing bushing 124 in the desired position.

Centrally below crank shaft 110, plunger 140 is vertically arranged. Plunger 140 has an upper end 142, a lower end 144 and a central axis 146. First closing tool 22 is attached to the lower end 144 of plunger 140. Plunger 140, according to the present embodiment, has the form of a cylindrical shaft.

Frame work 150 has a horizontally arranged lower plate 156 extending between side frames 152, 152 in the region of the lower end 144 of plunger 140. Lower plate 156 includes a guide barrel 157 aligned to plunger 140, in which plunger 140 is vertically guided. Lower end 144 of plunger 140 extends through and projects below guide barrel 157.

Guide track 130 is mounted to the upper end 142 of plunger 140. Guide track 130 according to FIGS. 2 and 3 has the form of a sector of a circle concavely aligned relative to plunger 140, with its free ends 132, 134 curved upwardly. Guide track 130 is centrally attached to the upper end 142 of plunger 140 and extends with its first free end 132 to the front side and with its second free end 134 to the rear side of the drive means or drive 100. Guide track 130 has an approximately rectangular cross-section.

Slide block 120 arranged above guide track 130, is in slidable engagement with guide track 130. Slide block 120 comprises angled lugs 126 which extend along its lower edges parallel to guide track 130, and which encompass guide track 130. The lower surface of slide block 120 and the surfaces of the angled lugs 129 facing each other, forming an opening which has a cross-section corresponding to the cross-section of guide track 130, and in which guide track 130 is slidably accommodated. The shape of the opening in the direction along guide track 130 is concave curved according to the curvature of guide track 130.

Figure 3:
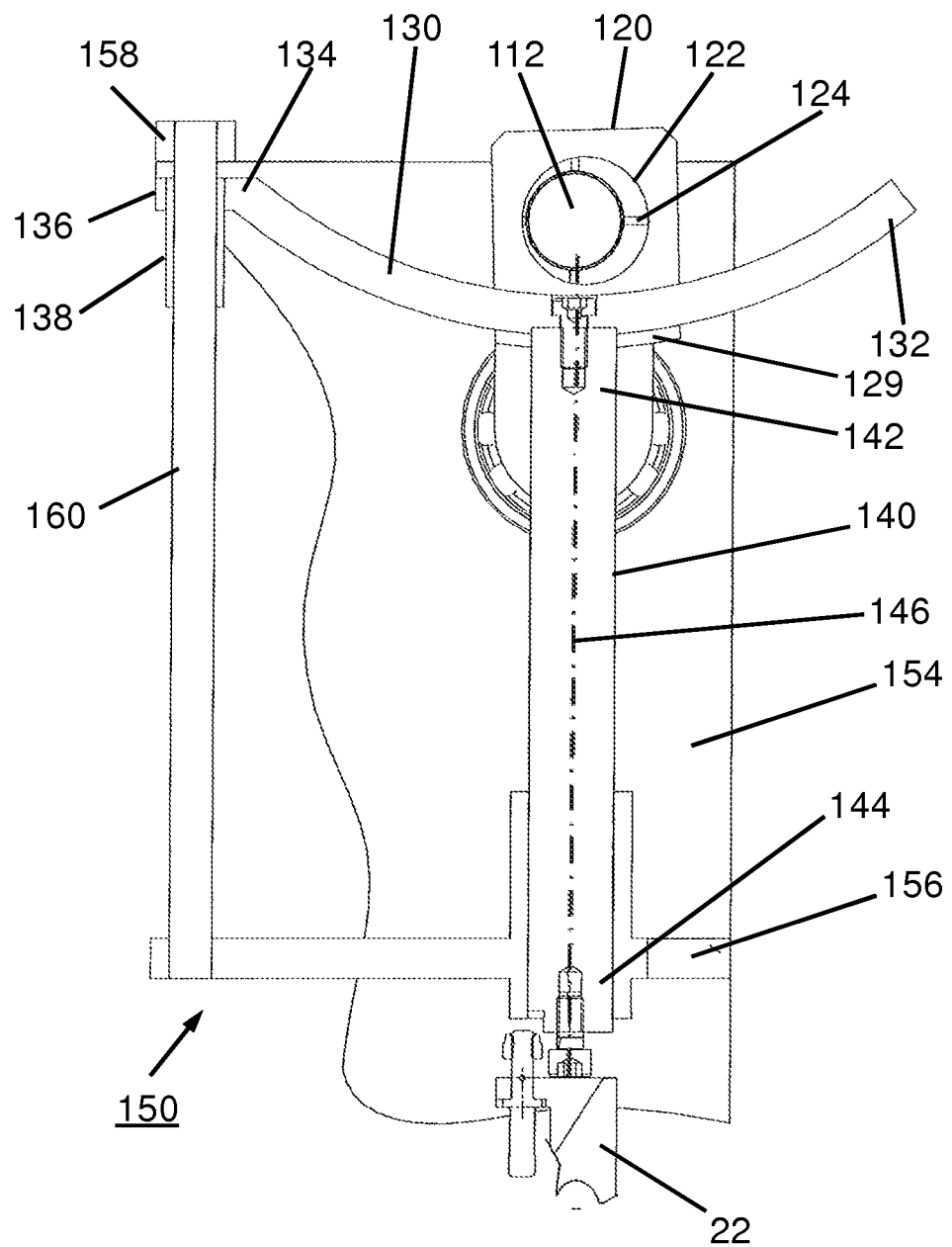
FIG. 3: is a cross sectional view to the drive means according to FIG. 1, in a plane through the central axis of the plunger.

As it further can be inferred from FIGS. 2 and 3, drive 100 comprises a guide bolt 160 arranged parallel to plunger 150. Guide bolt 160 is mounted to lower plate 156 of frame work 150 by its lower end and to a horizontally aligned frame bar 158 mounted the upper rear ends of side frames 152, 154 and extending there between. At its second free end 134, guide track 130 has a guide latch 136. Horizontally aligned guide latch 136 comprises a vertically arranged bushing 138 via which guide latch 136 is guided along guide bolt 160.

Figure 4:
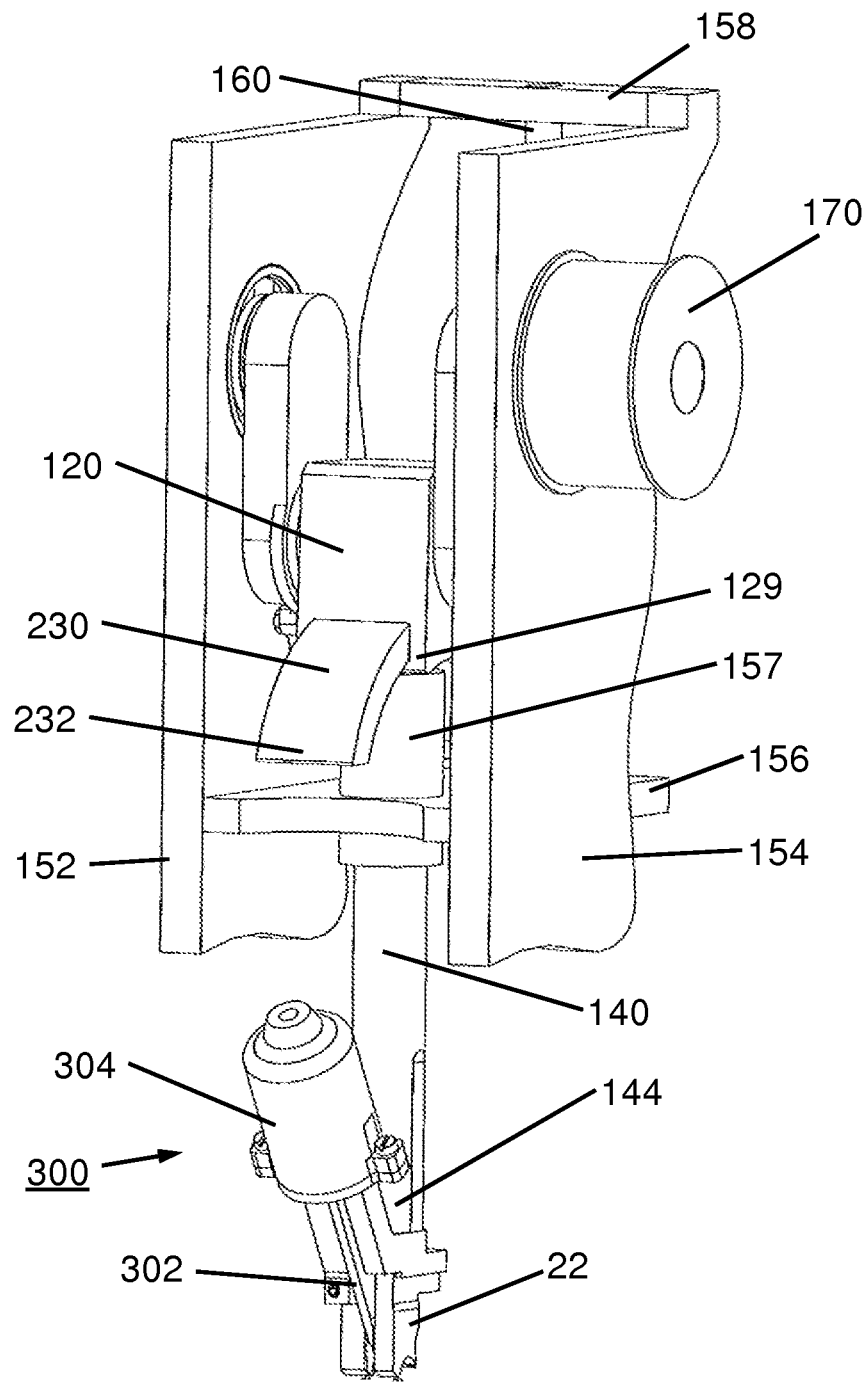
FIG. 4: is a schematic and perspective view to the drive means for the first closing tool, according to a second embodiment of the clipping machine, with the crank pin in the lower extreme position, having a convex curved guide track.

FIG. 4 shows a schematic and perspective view to drive 100 for the first closing tool 22 according to a second embodiment of clipping machine 1, with the crank pin 112 in the lower extreme position, having a guide track 230 being convex curved relative to plunger 140. That means, its free ends 232, 234 are curved downwardly. Accordingly, the lower surface of slide block 120 and the surfaces of the angled lugs 129 facing each other, form an opening which has a cross section corresponding to the cross section of guide track 230, in which guide track 230 is slidably accommodated. The shape of the opening in the direction along guide track 230 is convex curved according to the curvature of guide track 230.

Also, according to FIG. 4, a cutting device 300 is mounted to the lower end 142 of plunger 140. Cutting device includes a knife 302 driven by a piston/cylinder drive 304 which may be pneumatically or hydraulically be activated. Knife 302 extends into a slot of first pair of tools 22, and may be urged against the plait-like portion P of the tubular packaging casing M when the closing tools 22, 24 are in their closed position.

Figure 5:
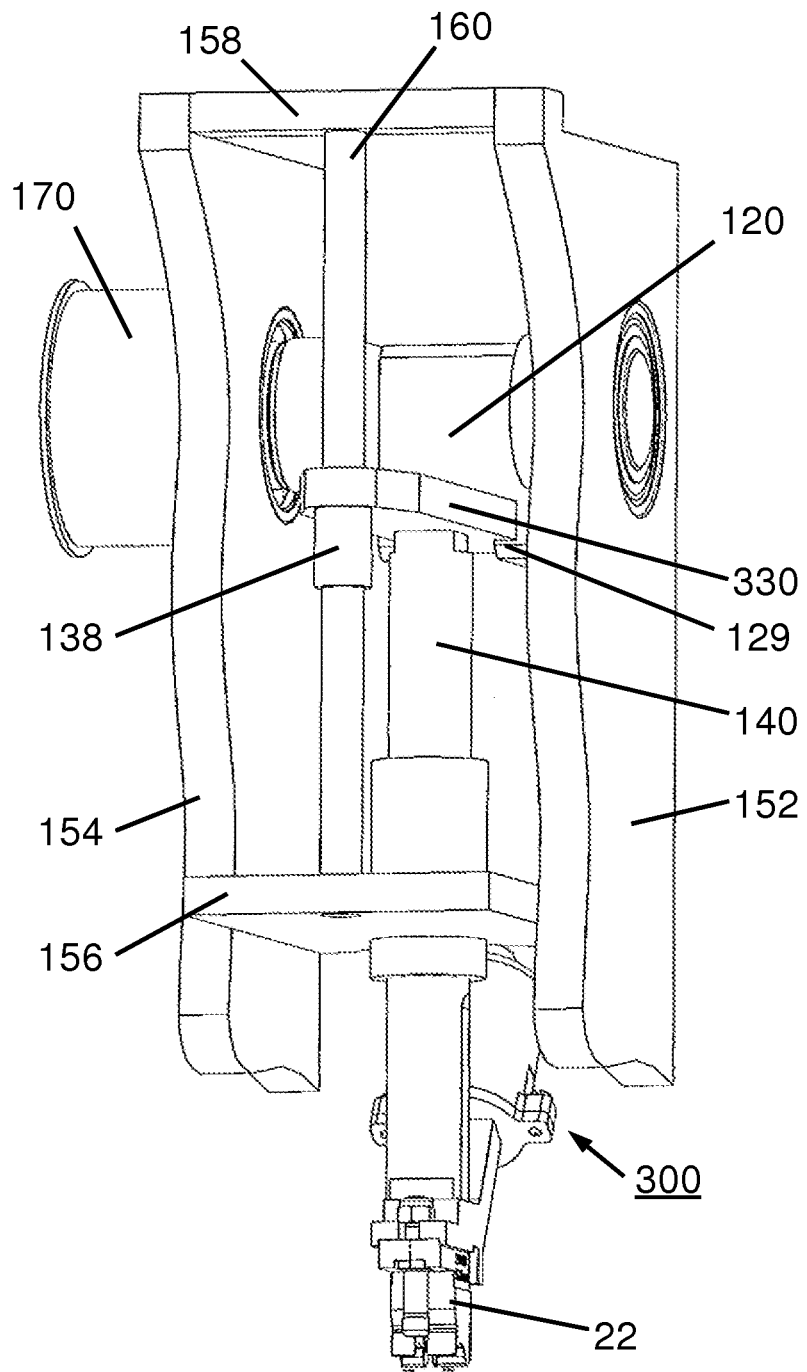
FIG. 5: is a schematic and perspective view to the drive means for the first closing tool, according to a third embodiment of the clipping machine, with the crank pin in an intermediate position, having a linear guide track.

FIG. 5 is a schematic and perspective view to the drive unit or drive 100 for the first closing tool 22 according to a third embodiment of the clipping machine 1, with the crank pin 112 in an intermediate position between the upper and lower extreme position of the crank pin 112, having linear guide track 330. Drive 100 according to FIG. 5 is identically assembled including the identical parts as drives 100 according to FIGS. 1 to 4, except guide track 330 which extends linearly from the rear side of drive 100 to the front side of drive 100. Guide track 330 is slidably engaged by slide block 120, wherein the opening formed by the lower surface of slide block 120 and the surfaces of the angled lugs 129 facing each other, has a cross-section corresponding to the cross section of guide track 330, in which guide track 230 is slidably accommodated. The shape of the opening in the direction along guide track 330 is linear according to the linear extension of guide track 330.

For producing sausage-shaped products S, filling material is fed through filling tube 10 into tubular packaging casing M which is closed at its front end by a closure clip C. After a predetermined portion of filling material is fed into tubular packaging casing M, gathering means 30, in particular, first and second displacer units 32, 34 forms a plait-like portion P to the tubular packaging casing M. Thereafter, two closure clips C are attached to the plait-like portion P, a first closure clip C in order to close the just filled section of the tubular casing packaging M, and the second closure clip C in order to close the front end of the remaining tubular packaging casing M.

For applying a closure clip C to the plait-like portion P, and for closing said closure clip C, first and second closing tools 22, 24 are moved towards the plait-like portion P. The closure clip C to be applied and closed, is provided in one of the closing tools 22, 24, preferably in the lower or second closing tool 24, being e.g. the first or front most closure clip C of a line of closure clips C.

For moving the upper or first closing tool 22 towards the plait-like portion P, drive 100 is driven by rotating crank shaft 110 via pulley 170. Thereby, crank pin 112 is rotated on a circular course about the axis of rotation of center pins 114 of crank shaft 110. Slide block 120 slides along guide track 130, 230, 330 in an approximately lateral direction and moves plunger 140 together with first closing tool 22 which is mounted to the lower end 144 of plunger 140 vertically up and downwardly between the extreme positions of crank pin 112, and closing tool 22 between its opened and closed position, respectively.

For enabling plunger to be moved exactly vertically, plunger 140 is vertically guided in guide barrel 157 of lower frame plate 156. Additionally, to avoid additional load to plunger 140 during the closing process, in particular, when closing tool 22 is in the region of its closed position, the upper end 142 of plunger 140 is supported by guide track 130, 230, 330 via guide bolt 160 at which the rear or second free end 134, 234, 334 of guide track 130, 230, 330 is slidable guided for avoiding lateral movement of upper end 142 of plunger 140.

In the closed position of first closing tool 22, as shown in FIG. 4, also the second closing tool 24 is in its closed position and closing tools 22, 24 are in closed vicinity to each other, the so called closure distance, which corresponds to the heights of the closed closure clip C. For adapting the clipping machine to different closing clips C, and different closure heights, accordingly, bushing 124 may be rotated relative to crank pin 112 by handle 126. Thereby, the position of slide block 120 is changed relative to crank pin 112, whereby also the position, in particular the vertical position, of plunger 140 with the first closing tool 22 at its lower end 144 is changed in order to be adapted to different closure clips C, but also to in order to counterbalance wear. For fixing handle 126 in the desired position, a fixing device (not shown in detail) is provided, like a clamping mechanism or any other applicable locking device.

Guide track 330 as shown in FIG. 5 extends horizontally and linear with its free ends 132, 134 facing to the front side and the rear side of drive 100. In case that crank shaft 110 is driven at a constant speed, plunger 140 and first closing tool 22, respectively, is driven at a speed having a sinusoidal characteristic. During a complete cycle, starting from the upper extreme position, the speed of first closing tool rises from zero to a maximum value in the intermediate position and falls to zero when closing tool 22 is in its lower extreme position. Thereafter, the speed of closing tool 22 rises up to the maximum value in the intermediate position, and falls to zero in the upper extreme position, following a sinusoidal characteristic.

According to FIGS. 2 to 4, guide tracks 130, 230 have the form of a segment of a circle. Free ends 132, 134 of guide track 130 are directed upwardly, whereas free ends 232, 234 of guide track 230 are directed downwardly. When using said non-linear guide tracks 130, 230, the speed characteristic of plunger 140 and closing tool 22, respectively, differs from the sinusoidal characteristic of closing tool 22, when using linear guide track 330.

Regarding guide track 130 having upwardly directed free ends 132, 134, during a complete revolution of the crank shaft 110, in the first quarter from the upper extreme position of crank pin 112 to its intermediate position, as shown in FIG. 5, the acceleration of closing tool 22 is higher relative to the respective sinusoidal curve. In the second and third quarter between the two intermediate positions, between which the lower extreme position of closing tool 22 has been passed, the acceleration is lower than the respective sinusoidal acceleration. Finally, in the fourth quarter of one revolution of crank shaft 110, between the second intermediate position and the upper extreme position of closing tool 22, the value of the acceleration corresponds to the value as reached in the first quarter of the cycle of rotation of crank shaft 110.

Accordingly, when using guide track 230 having downwardly directed free ends 232, 234, the acceleration values in the first and fourth quarter of the revolution of crank shaft 110 fall below the values of the respective sinusoidal curve. In the second and third quarters, the acceleration values exceed the values of acceleration of closing tool 22.

It has to be noted, that the variation of the acceleration values of closing tool 22 from that of the respective sinusoidal curve is dependent on the diameter of the circle and the angle of the segment of the circle.

Guide tracks 130, 230, 330 have been described as being of a constant shape over their length, a linear or curved shape. It is also possible that a guide track may consist of segments of different shape, e.g. a combination of a linear and a circular segment or a combination of circular segments being curved in different directions.

Moreover, crank shaft 110 has been described as being driven at a constant speed. It is also possible to vary the drive speed of crank shaft 110 over a complete circle, i.e. to reach a higher speed of closing tool 22 when being moved to and/or away from its closed or lower extreme position.

The guide tracks have been described as being mounted to the upper end 142 of plunger 140. According to FIG. 3, a screw is shown for mounting guide track 130 to plunger 140. Any other suitable mounting means may be used to attach a guide track to plunger 140.

It has also to be noted that the guide tracks should be exchangeable with plunger 140 to allow mounting of a specific guide track to the clipping machine, e.g. in order to adapt said clipping machine to a respective sausage-shaped product to be produced. With regard to said mounting means, it has to be noted, that said mounting means should enable a quick and easy exchange of the guide track.

The guide tracks have further been described as compact bars of an approximately rectangular cross section. Naturally, the guide tracks may have any other suitable cross section, like a triangular of circular cross section. In these cases, the slide block should have a respective lower surface and accordingly shaped lugs for encompassing said guide track.

Alternatively, the guide track may comprise a slot extending approximately over its entire length. For engaging said guide track, the slide block should include an engagement pin for engaging said slot and sliding therein. It has further to be understood that the size of the engagement pin should match the size of the slot. In case of a circular engagement pin, the diameter of said pin should correspond to the width of the slot.

The invention claimed is:

1. A clipping machine for producing sausage-shaped products, like sausages, by filling a flowable filling material into a tubular or bag-shaped packaging casing and closing said packaging casing by a closure clip, the clipping machine comprises a filling tube for feeding the filling material into the tubular or bag-shaped packaging casing stored on the filling tube and closed at its first end, a gathering means for gathering the filled tubular or bag-shaped packaging casing and for forming a plait-like portion thereto, and a clipping device having a first and a second closing tool reversibly movable between an opened position and a closed position, for applying the at least one closure clip to the plait-like portion and closing said closure clip when the closing tools are in their closed position, wherein the clipping device includes a drive means for driving the first closing tool,
   where said drive means comprises a crank shaft having a crank pin, and a plunger having a central axis, for holding and linearly moving the first closing tool between its opened and closed position along the central axis, wherein a guide track is mounted to the plunger, and wherein a slide block pivotally attached to the crank pin is in slidable engagement with said guide track for moving said plunger along the central axis.

2. The clipping machine according to claim 1, wherein the guide track is formed by an at least approximately semicircular formed bar.

3. The clipping machine according to claim 1, wherein the guide track is formed by linear bar.

4. The clipping machine according to claim 1, wherein the guide track includes a guide slot being engaged by the slide block.

5. The clipping machine according to claim 1, wherein the guide track is slidably coupled to a guide bolt.

6. The clipping machine according to claim 1, wherein the slide block includes adjusting means for adjusting the position of the slide block relative to the crank pin.

7. The clipping machine according to claim 6, wherein the adjusting means include an excenter means.

8. The clipping machine according to claim 1, wherein a cutting unit is mounted to the lower end of the plunger.

\* \* \* \* \*